Dec. 15, 1936.  P. WODARCZYK  2,064,188
TRAP
Filed May 22, 1933
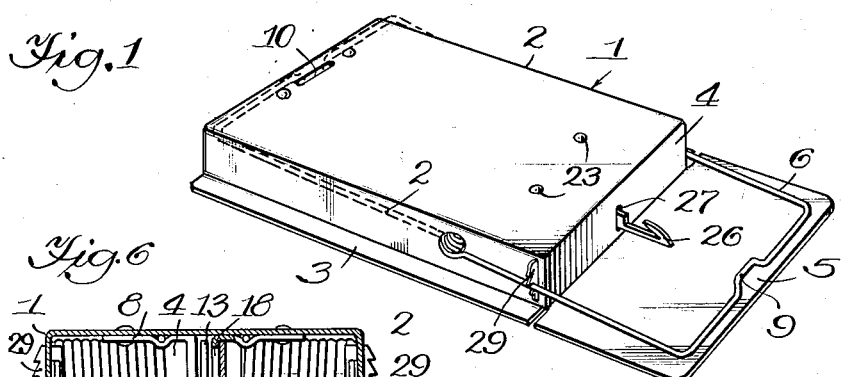
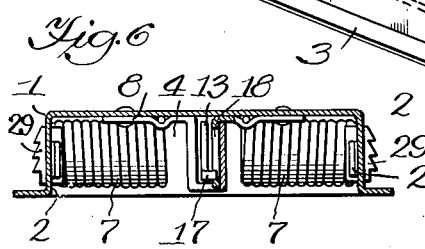
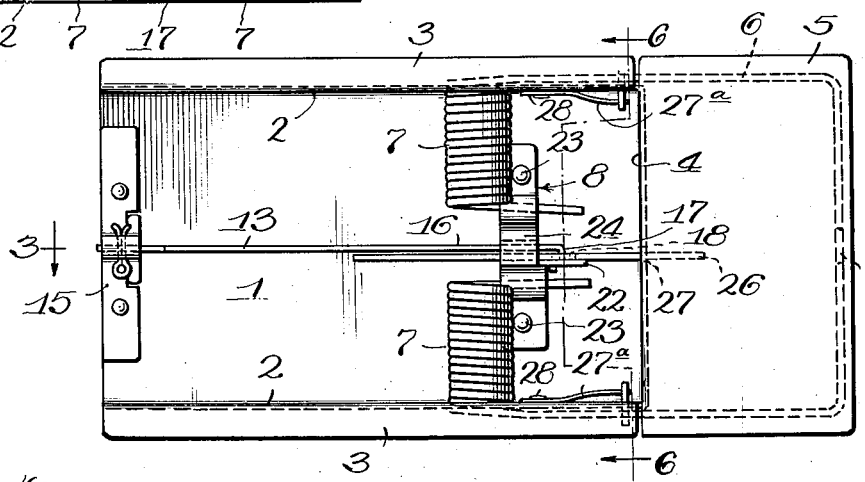
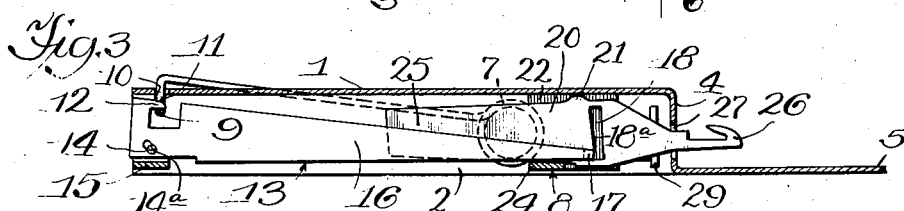
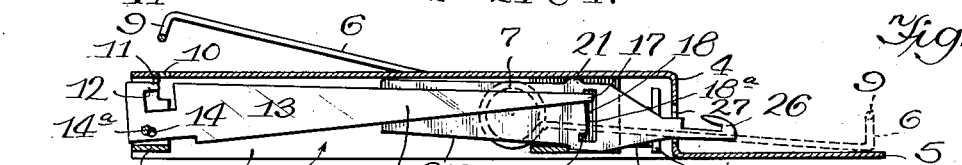
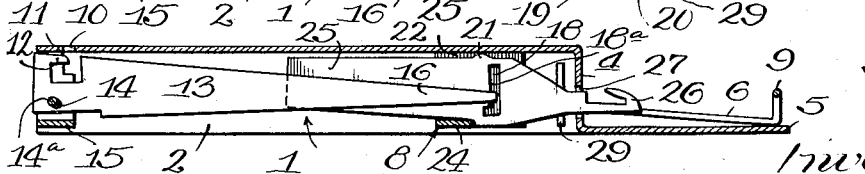
Inventor,
Paul Wodarczyk
Parkinson & Lane, Attys.
Witness:

Patented Dec. 15, 1936

2,064,188

UNITED STATES PATENT OFFICE 2,064,188

TRAP

Paul Wodarczyk, Chicago, Ill.

Application May 22, 1933, Serial No. 672,212

5 Claims. (Cl. 43—81)

The present invention relates to traps, and more in particular to a novel construction of a self-latching trap, and in the latching and releasing mechanism therefor.

Among the objects of the present invention is to provide a novel construction of trap provided with self-latching means whereby to eliminate the danger of having the fingers or other parts of the body caught by the impact of the spring bail upon an accidental release thereof while it is being set.

A further object of the invention is the provision of a novel trap constructed entirely of metal and provided with a housing or casing for enclosing the mechanism for latching and releasing the spring bail.

Another object of the invention is to provide a novel combination and construction of levers or arms adapted to automatically latch or lock the spring bail in a position to be promptly released, and to positively release said bail when the trap is sprung.

A still further object is the provision of a novel means for locking the bail in its lowered or sprung position whereby to prevent a rodent or other animal trapped thereby from withdrawing or releasing itself by forcing the spring bail upwardly and out of holding contact.

Another object of the invention is the provision of a trap construction which is practically indestructible and is positive in operation, and which may be manufactured cheaply.

Further objects are to provide a construction of maximum simplicity, efficiency, economy, and ease of assembly and operation, and such further objects, advantages and capabilities as will later more fully appear and are inherently possessed thereby.

The invention further resides in the combination, construction and arrangements of parts illustrated in the accompanying drawing, and while there is shown therein a preferred embodiment, it is to be understood that the same is susceptible of modification and change, and comprehends other arrangements and details, without departing from the spirit of the invention.

In the drawing:

Fig. 1 is a view in perspective of the novel trap construction.

Fig. 2 is a bottom view thereof.

Fig. 3 is a view in vertical cross section taken in a plane represented by the line 3—3 of Fig. 2, and showing the trap set.

Fig. 4 is a view similar to Fig. 3 but showing the position of the parts when the trap is sprung.

Fig. 5 is a view similar to Figs. 3 and 4, but showing the position of the parts after the trap has been sprung.

Fig. 6 is a view in vertical cross section taken in a plane represented by the line 6—6 of Fig. 2.

Referring more particularly to the disclosure in the drawing, the trap comprises a body portion 1 adapted to form an enclosure or housing for the latching and releasing mechanism, the sides 2 thereof being provided with outwardly extending flanges 3 adapted to add stability to the construction. The front side 4 of the body member is provided with a forwardly extending apron or shelf 5.

A spring bail 6 has the ends of its coils 7 anchored beneath a bracket or plate 8 within the enclosure. The bail 6 is provided with a U-shaped portion or loop 9, adapted to be received within an opening 10 in the top of the body member, when the trap is set. The U-shaped portion or loop 9 is forced into the opening 10 when the trap is being set and downwardly over a cam surface 11 on an overhanging or projecting shoulder 12 within a cut-out portion in a lever or arm 13. This lever or arm is provided with an enlarged, angularly arranged opening 14 and is pivoted at 14a within a bracket member 15 suitably mounted on the base of the trap, and is so arranged as to be overbalanced whereby the forwardly extending end 16 thereof will normally drop by gravity and cause the shoulder 12 to project over the U-shaped portion 9 of the bail. This is clearly disclosed in Fig. 3 of the drawing in which view the trap is shown as being set with the U-shaped portion 9 of the bail seating against the under side of the shoulder 12.

In order to retain the bail in latched position and to permit the ready release thereof so that the trap may be sprung, the forwardly extending end 16 of the lever or arm 13 is reduced and provided with a lateral projection 17 adapted to extend into a slot 18 having a tapered side 18a formed at its lower end with a shoulder 19. This slot forms a guide for the travel of the lateral projection 17.

When the trap is being set and the bail 6 is forced over the cam surface 11, it withdraws or forces the arm or lever 13 rearwardly within the elongated slot 14, and as the front end 16 of the pivoted arm or lever 13, by reason of its overbalanced weight, drops by gravity, it brings the shoulder 12 over the U-shaped portion or loop 9 of the bail. At the same time, the lateral extension or projection 17, by reason of the arm 13 being withdrawn, will seat in the off-set portion at the base of the slot 18 and against the shoulder 19, whereupon the trap will be set.

This slot 18 is formed in a second arm or lever 20 provided with an extension or lug 21 seating in a notch in the plate 22 formed on the bracket member 8. This bracket member is disclosed as connected at 23, 23, to the under side of the body member or base 1, and intermediate its length is provided with a U-shaped depending portion 24 of which the plate 22 forms one side, for receiving the forward end of the arm or lever 13, and the arm or lever 20. This arm or lever 20 is also overbalanced at its rear end 25, and at its front end is provided with a bait hook or treadle 26 passing through an opening 27 in the front wall 4 of the trap.

As shown in Fig. 3, when the lateral extension or projection 17 seats against the shoulder 19, the bait hook 26 is elevated. When a rodent or other animal causes but a slight impact or downward pressure upon the hook 26, the lowering of this hook will permit the extension 17 to pass from under the shoulder 19 and upwardly in the slot 18. The tension of the spring bail 6 will trip the shoulder or latch 12 so as to raise the extension 17 in the slot 18 and permit the trap to be sprung.

Fig. 4 shows the position of the arms 13 and 20 just as the trap has been sprung or released, with the pivot point or fulcrum of the arm 13 at the forward and lower end of the slot 14. In Fig. 5, the arms are shown after the trap has been sprung and gravity acting on the arm 13, has shifted its fulcrum or pivot point to the rear of the slot 14. In this latter position, the trap is again ready to be set, and when the part 9 of the bail is forced down over the cam surface 11, the lever or arm 13 will be forced rearwardly, the projection 17 thereof riding over the side 18ª and into the groove at the end of the slot 18, since the arm 20 is freely pivoted at 21. When the part 9 seats against the shoulder 12, the trap is set.

In order to prevent a rodent or other animal from withdrawing and escaping after it has been caught by the spring bail, the invention comprehends the provision of spring clips 27ª mounted within the trap at the opposite sides thereof as at 28, each spring clip being provided with a ratch or rack 29, the teeth thereof being adapted to be engaged by the side members of the spring bail 6, and thereby preventing the spring bail from being raised after the trap has been sprung, except by manually forcing the racks through openings in the sides 2 of the trap or body member.

From the above description and the disclosure in the drawing, it will be readily apparent that the invention comprehends a novel construction of trap which may be manufactured in any desired size for use in trapping various animals and wild life.

Having thus disclosed the invention, I claim:

1. A trap comprising a body member forming an enclosure for the mechanism and a shelf, the top of said body member and a side thereof being provided with a slot, a spring bail having a loop adapted to be received in the slot in the top of said member, and overbalanced levers pivotally mounted within said member, one of said levers being pivoted adjacent an end thereof and provided with a hook adapted to engage the loop on said bail and retain the bail in position, said lever having a movable fulcrum for receiving the bail, a projection on said first mentioned lever, the other of said levers being provided with a slot having an offset shoulder and a bait hook extending through the slot in the side of the body member and above said shelf, said levers being so mounted that when the trap is set and the loop is forced over the hook on the first mentioned lever, the forward part of said first mentioned lever is lowered by gravity and its projection seats in the slot in said second mentioned lever and against said shoulder whereby the hook retains the bail in latched position, and when the bait hook is depressed, said shoulder is lowered and the projection is released permitting the bail to trip the hook and spring the trap, said bail thereupon forcefully contacting said shelf.

2. A trap comprising a body member forming an enclosure for the mechanism and a shelf, the top of said body member and a side thereof being provided with a slot, a spring bail having a loop adapted to be received in the slot in the top of said member, and overbalanced levers pivotally mounted within said member, one of said levers being pivoted adjacent an end thereof and provided with a hook adapted to engage the loop on said bail and retain the bail in position, said lever having a movable fulcrum for receiving the bail, a projection on said first mentioned lever, the other of said levers being provided with a slot having an offset shoulder and a bait hook extending through the slot in the side of the body member and above said shelf, said levers being so mounted that, when the trap is set and the loop is forced over the hook on the first mentioned lever, the forward part of said first mentioned lever is lowered by gravity and its projection seats in the slot in said second mentioned lever and against said shoulder whereby the hook retains the bail in latched position, and when the bait hook is depressed, said shoulder is lowered and the projection is released permitting the bail to trip the hook and spring the trap, said bail thereupon forcefully contacting said shelf, and means for locking the spring bail comprising toothed members extending through the sides of said body member.

3. An animal trap, comprising a base, a spring actuated jaw, a bait-holding treadle, a latch member having an inclined slot at its rear end, and guiding and holding means arranged through said slot and secured to said base, said latch member having a cam surface engageable by the jaw as it approaches set position for causing the latch member to ride up said holding means, said latch member returning by gravity to engage said jaw in set position.

4. A trap comprising a body member and a shelf, the top of said body member and a side thereof being provided with a slot, a spring actuated bail having a projection adapted to be received in the slot in top of said body member, a bait-holding treadle projecting through the slot in the side of said body member, means for holding said bail and for releasing said bail when pressure is applied to said treadle comprising a system of levers and catches housed within said body member, said bail forcefully contacting said shelf upon being released.

5. An animal trap comprising a base, a spring actuated jaw, a latch lying horizontal of the base, means for supporting the latch so as to be movable first upwardly and rearwardly and then forwardly and downwardly, a cam surface on the latch engageable by the jaw when moved to set position to move the latch upwardly and rearwardly and then permit the latch to move forwardly and downwardly to hold the jaw set, and a bait treadle for tripping the latch to release the jaw.

PAUL WODARCZYK.